(12) United States Patent
McGibbon

(10) Patent No.: US 6,923,910 B2
(45) Date of Patent: Aug. 2, 2005

(54) FILTER CARTRIDGE HAVING BYPASS FEATURE

(75) Inventor: Donald McGibbon, Southington, CT (US)

(73) Assignee: CUNO Incorporated, Meriden, CT (US)

( * ) Notice: Subject to any disclaimer, the term of this patent is extended or adjusted under 35 U.S.C. 154(b) by 361 days.

(21) Appl. No.: 10/337,832

(22) Filed: Jan. 7, 2003

(65) Prior Publication Data
US 2004/0129627 A1 Jul. 8, 2004

(51) Int. Cl.$^7$ ................................................ B01D 27/10
(52) U.S. Cl. ....................... 210/232; 210/434; 210/440; 210/450
(58) Field of Search ................................ 210/133, 444, 210/434, 450, 232, 423, 439, 433.1, 440

(56) References Cited

U.S. PATENT DOCUMENTS

| 4,735,716 A | 4/1988 | Petrucci et al. |
| 5,606,702 A | 2/1997 | Diel et al. |
| 6,576,129 B1 * | 6/2003 | Reid ........................... 210/232 |

* cited by examiner

Primary Examiner—Terry K. Cecil
(74) Attorney, Agent, or Firm—R. Thomas Payne; John Tomich

(57) ABSTRACT

A filter cartridge 10 includes a connective end for mating with a filter head 48 and providing fluid communication between the filter media chamber and the filter head. The connective end includes a tubular member 34 disposed axially in a hollow neck 18 to define inner and radially outer axial passages (30, 32) providing independent conduits for dual flow through the neck. The outer axial passage includes an opening 38 in the elongated portion 22 of the neck and a bypass opening 42 in the distal end portion of the neck. The inner axial passage includes an opening 40 in the distal end of the neck. Proximal and distal radial seals (26, 28) are provided on the outer periphery of the elongated neck portion 22 to ensure water-tight engagement when the neck is inserted into the receiving core of the filter head.

20 Claims, 8 Drawing Sheets

Fig. 8
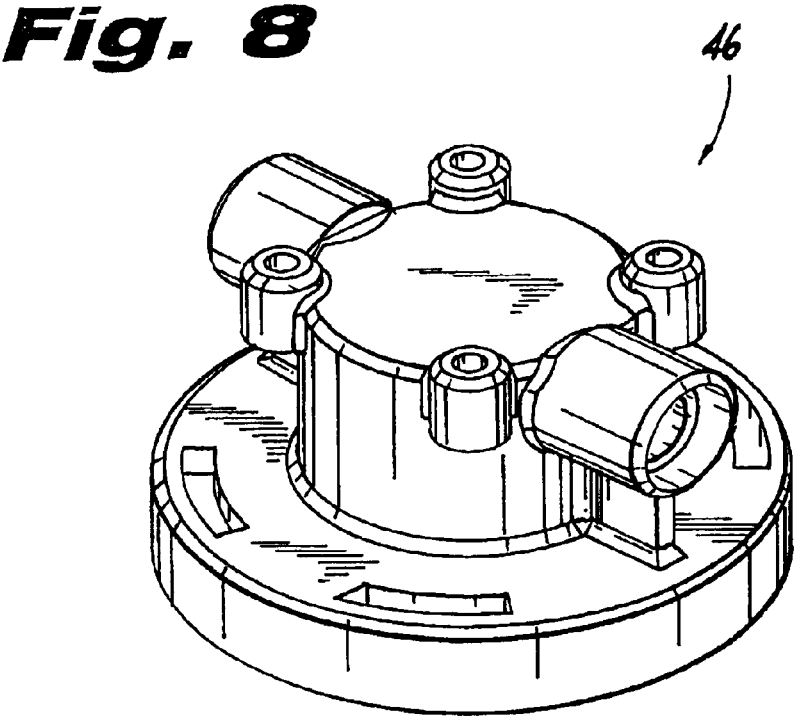
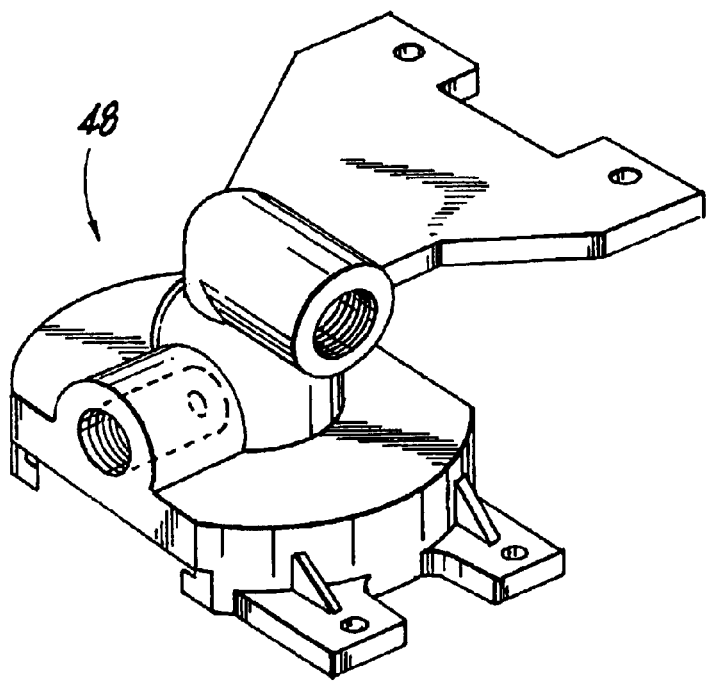
Fig. 9

FILTER CARTRIDGE HAVING BYPASS FEATURE

BACKGROUND OF THE INVENTION

1. Field of the Invention

The present application relates to filtration systems which include replaceable filter cartridge housings that have a bypass feature associated therewith, more particularly, to filter cartridge housings which include a bypass channel that allows fluid to proceed from the inlet portion of the cartridge to the discharge portion of the cartridge without contacting the filer media disposed within the cartridge housing, and still more particularly, to a replaceable cartridge which provides economic advantages through improved filtration capacity while maintaining the hardness of the water output within a desirable range.

2. Background of the Related Art

Often in both consumer and industrial applications a fluid, such as water, is filtered prior to its use in an intended application. As a result, filtration systems are installed either internally or externally within the industrial system or consumer appliance. For example, in today's modern society, refrigerators which provide drinking water and produce ice are widespread. Commonly this type of refrigerator utilizes an internal filtration system for purifying the water used for drinking and ice production. Additionally, since water is the base for many beverages such as soda and coffee, it is also commonplace to find water filtration assemblies installed within or in conjunction with commercial vending machines that dispense coffee or soft drinks.

Like most filtration systems, frequent replacement of the filter media is required to sustain proper filtration and the quality of the output flow. Therefore, the aforementioned filtration assemblies are typically equipped with filter cartridges that can be easily disengaged from a filter head, discarded and replaced, without requiring the removal of the remaining components of the filter system.

Other than ease of use, filter cartridge manufacturers, as well as their buyers and end users, consider characteristics such as long-life, filtration ability, low cost design to be of primary importance. The filtration ability is probably the most variable quality since it depends highly on the characteristics of the input water and desired characteristics of the output flow. The life of the filter is largely related to the operative flow rate through the filter and type or degree of filtration desired. Customization of the filter cartridges to meet the desired filtration ability will result in increase costs. Lower costs may be achieved and maintained if one or a few standard filter cartridges can be mass-produced and utilized for a plurality of applications.

A good example of the relationship between filtration ability and filter life may be found in applications which incorporate such replaceable filters for water hardness reduction. Preliminary, it should be noted that hardness of water, as used herein, refers to the content of calcium and magnesium salts, which may be bicarbonates, carbonates, sulfates, chlorides, or nitrates. Furthermore, hardness is a measure of calcium and magnesium salts expressed as equivalent calcium carbonate content and is usually stated in parts per million (ppm) or grains per gallon (gpg) as follows: very soft water, less than 15 ppm; soft water, 15 to 50 ppm; slightly hard water, 50 to 100 ppm; hard water, 100 to 220 ppm; and very hard water, over 220 ppm.

In the case of water hardness reduction, most filter media in use today have the ability to remove a substantially high percentage, if not essentially all, of the calcium and magnesium from the input water. Most applications utilize the filter cartridges for total removal of calcium and magnesium, or at the very least, can endure such removal without harmful results. However, a high level of calcium and magnesium removal is not desirable for all applications, such as applications requiring "recipe quality water" (e.g., beverage mixing applications) that must maintain a level of hardness within a constant range to deliver an end product having a pleasing taste, among other things.

In addition, a high rate of removal reduces the life of the filter, and thus, filtration capability. Many end users utilize such filters for applications in which a lowered rate of calcium and magnesium removal may be tolerated. It is unnecessary for these end users to pay higher costs resulting from filter replacement and decreased filtration capability, especially in situations where the input water is hard or very hard.

The aforementioned issues, and manner in which they may be addressed, poses a problem for manufacturers and end users alike. Customization of the filter cartridge, filtration head, or filtration system apparatus to achieve the desired recipe quality water can satisfy specific needs, but such individualized changes can result in significantly increased costs and/or problems with equipment operability, among other things.

Thus, what is needed is a viable cost-effective solution to the aforementioned problems with respect to water hardness, as well as with respect to similar problems achieving desirable output water characteristics and/or decreasing the cost of operation by operating the filtration system with a decreased removal rate.

SUMMARY OF THE INVENTION

The present invention solves the problems of the prior art by, among other things, providing a connective end for a filter cartridge that provides fluid communication between a filter media chamber and a filter head having a receiving core, and first and second fluid conduits. The connective end in accordance with the present invention includes a substantially hollow neck defining a distal end portion, an elongated portion and a proximal end portion for mating with the filter media chamber. A tubular member is disposed axially in the neck which defines an inner axial passage and a radially outer axial passage bounded by the periphery of the tubular member and inner surface of the neck, so that the inner axial passage and the outer axial passage provide independent conduits for dual fluid flow through the neck.

The tubular member has an opening in the distal end portion of the neck and at least one opening to the outer axial passage is positioned in the elongated portion of the neck. In addition, a bypass opening to the outer axial passage is located in the distal end portion of the neck.

The neck includes a plurality of seals disposed along the outer periphery of the elongated portion for providing a substantially water-tight engagement between the neck and the receiving core. Preferably, a proximal radial seal is disposed adjacent to the proximal end and a distal radial seal is disposed adjacent the distal end portion. Together, the proximal and distal radial seals help maintain the integrity of fluid communication (i.e., limit contact between the influent and effluent streams, among other things) between the first conduit and the outer axial passage opening, or openings, and between the second conduit and the tubular opening and the bypass outer axial passage opening, respectively, when the connective end is engaged in the receiving core.

In a preferred embodiment of the aforementioned connective end, the bypass opening is substantially circular, and may have a diameter ranging from about 0.762 millimeters to about 1.78 millimeters. Preferably, the opening has an area ranging from about 0.45 mm$^2$ to about 2.5 mm$^2$.

The present invention is also directed to a filter cartridge including a filter media chamber, a substantially hollow neck defining a distal end portion, an elongated portion and a proximal end portion mated with the filter media chamber, and a tubular member disposed axially in the neck and extending into the filter media chamber. The tubular member defines an inner axial passage and a radially outer axial passage bounded by the periphery of the tubular member and inner surface of the neck, the inner axial passage and the outer axial passage providing independent conduits for dual fluid flow through the neck and the filter media chamber.

The tubular member has an opening located in the distal end portion of the neck and at least one outer axial passage opening positioned in the elongated portion of the neck. Also, a bypass outer axial passage opening is positioned in the distal end portion of the neck.

A proximal radial seal disposed along the outer periphery of the elongated portion of the neck adjacent the proximal end portion provides a substantially water-tight engagement between the neck and the receiving core. A distal radial seal disposed along the outer periphery of the elongated portion of the neck adjacent the distal end portion positioned also provides a substantially water-tight engagement between the neck and the receiving core. Together, the proximal and distal radial seals maintain the integrity of fluid communication between the first conduit and the outer axial passage opening, or openings, and between the second conduit and the tubular opening and the bypass outer axial passage opening, respectively.

In a preferred embodiment of the aforementioned filter cartridge, the bypass opening is substantially circular, and may have a diameter ranging from about 0.762 millimeters to about 1.78 millimeters. Preferably, the opening has an area ranging from about 0.45 mm$^2$ to about 2.5 mm$^2$.

The present invention is also directed to a filter cartridge and filter head assembly. The filter cartridge includes a filter media chamber, a substantially hollow neck, and a tubular member disposed axially in the neck and extending into the filter media chamber. The hollow neck includes a distal end portion, an elongated portion and a proximal end portion which is mated with the filter media chamber. The tubular member defines an inner axial passage and a radially outer axial passage within the neck. The outer axial passage is bounded by the periphery of the tubular member and inner surface of the neck. The inner axial passage and the outer axial passage provide independent conduits for dual fluid flow through the neck and the filter media chamber.

The tubular member has an opening located in the distal end portion of the neck and at least one outer axial passage opening positioned in the elongated portion of the neck. Also, a bypass outer axial passage opening is positioned in the distal end portion of the neck.

A proximal radial seal disposed along the outer periphery of the elongated portion of the neck, adjacent the proximal end portion, provides a substantially water-tight engagement between the neck and the receiving core. A distal radial seal disposed along the outer periphery of the elongated portion of the neck, adjacent the distal end portion, provides another substantially water-tight engagement between the neck and the receiving core. Together, the proximal and distal radial seals maintain the integrity of fluid communication between the first conduit and the outer axial passage opening, or openings, and between the second conduit and the tubular opening and the bypass outer axial passage opening, respectively.

The filter head of the present invention includes a receiving core configured to engage the neck of the filter cartridge, a first conduit, and a second conduit for fluid flow therein. The first conduit includes an opening to the receiving core which is positioned so that it is adjacent to the elongated portion of the neck when the neck of the filter cartridges is engaged within the receiving core. The second conduit includes an opening to the receiving core which is positioned so that it is adjacent to the distal portion of the neck when the neck of the filter cartridge is engaged within the receiving core.

The proximal and distal radial seals define a first reservoir bounded by the proximal and distal radial seals and the receiving core in fluid communication with the first conduit opening and the outer axial passage opening, or openings. A second fluid reservoir is also defined by the distal seal and the receiving core in fluid communication with the second conduit opening, the tubular opening and the bypass outer axial passage opening.

Other objects and advantages of the application will be apparent from the following description, the accompanying drawings and the appended claims.

BRIEF DESCRIPTION OF THE DRAWINGS

So that those having ordinary skill in the art to which the present application appertains will more readily understand how to make and use the same, reference may be had to the drawings wherein:

FIG. 8 is a perspective view of another exemplary filter head in which a filter cartridge constructed in accordance with the present invention may be installed;

FIG. 9 is a perspective view of another exemplary filter head in which a filter cartridge constructed in accordance with the present invention may be installed;

DETAILED DESCRIPTION OF THE PREFERRED EMBODIMENTS

Figure 1:
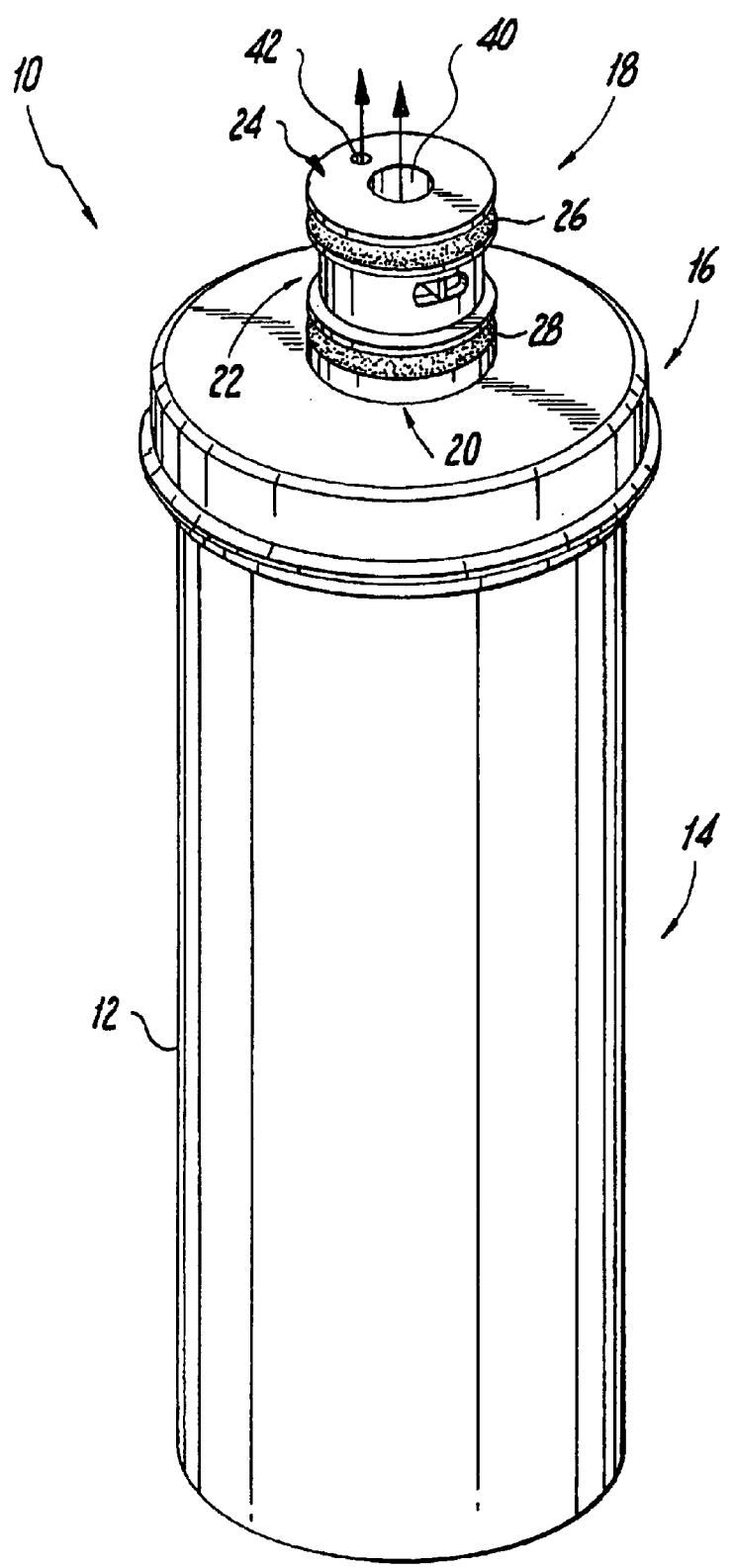
FIG. 1 is a perspective view of a disposable filter cartridge constructed in accordance with the present invention.
Figure 2:
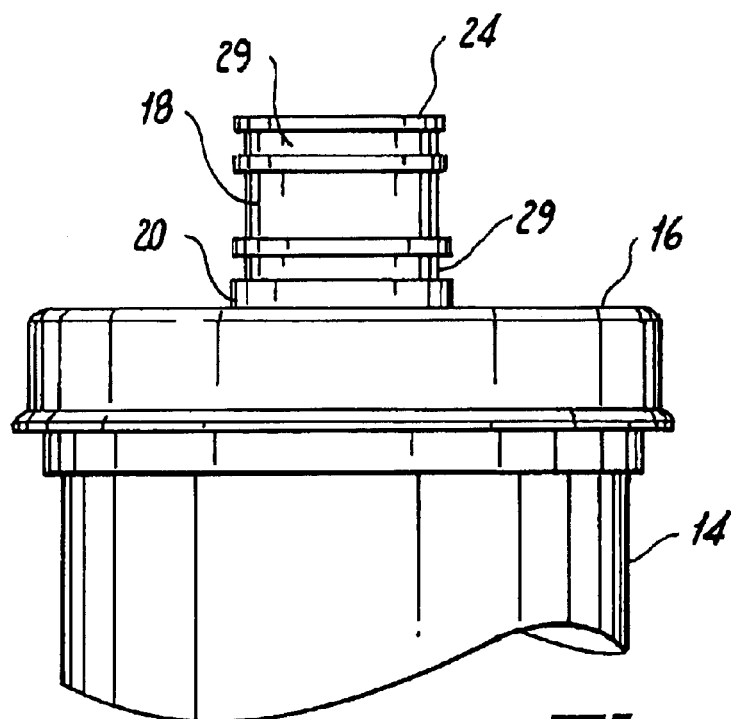
FIG. 2 is a side elevational view of the upper portion of the filter cartridge shown in FIG. 1, including the cover and neck.
Figure 3:
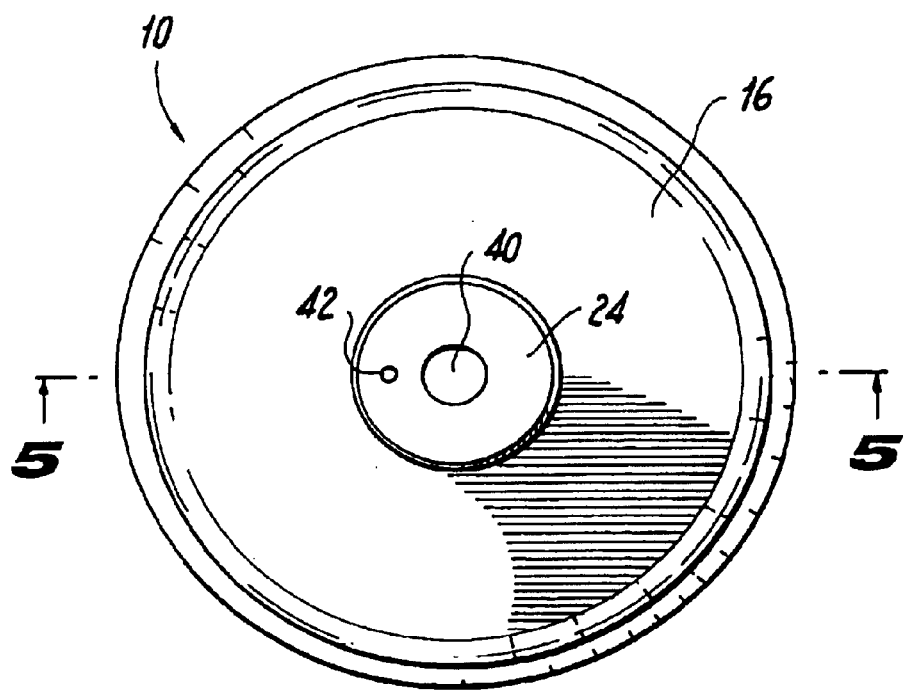
FIG. 3 is a top plan view of the cover for a cartridge shown in FIG. 1.
Figure 4:
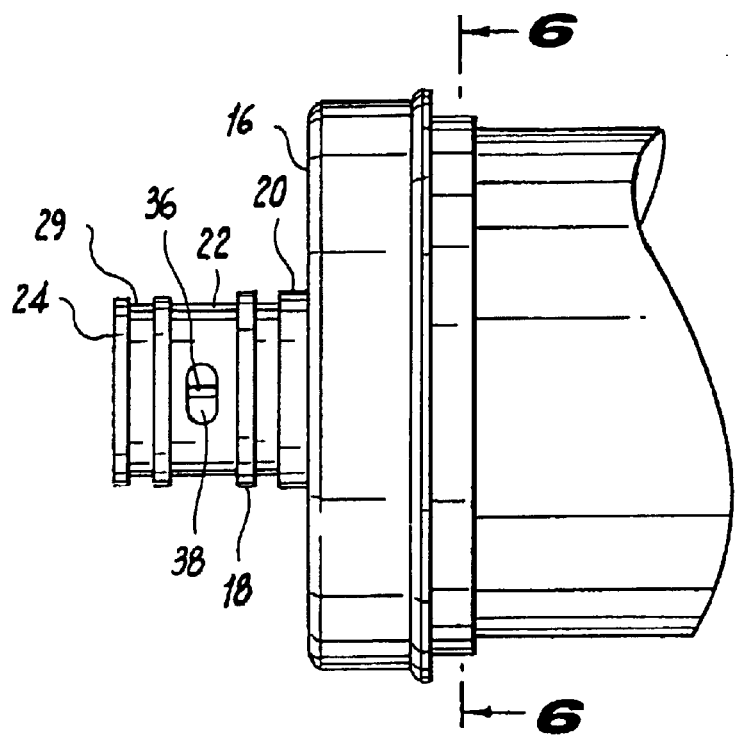
FIG. 4 is a side elevational view of the upper portion of the filter cartridge shown in FIG. 1, including the neck and fluid opening therein.
Figure 5:
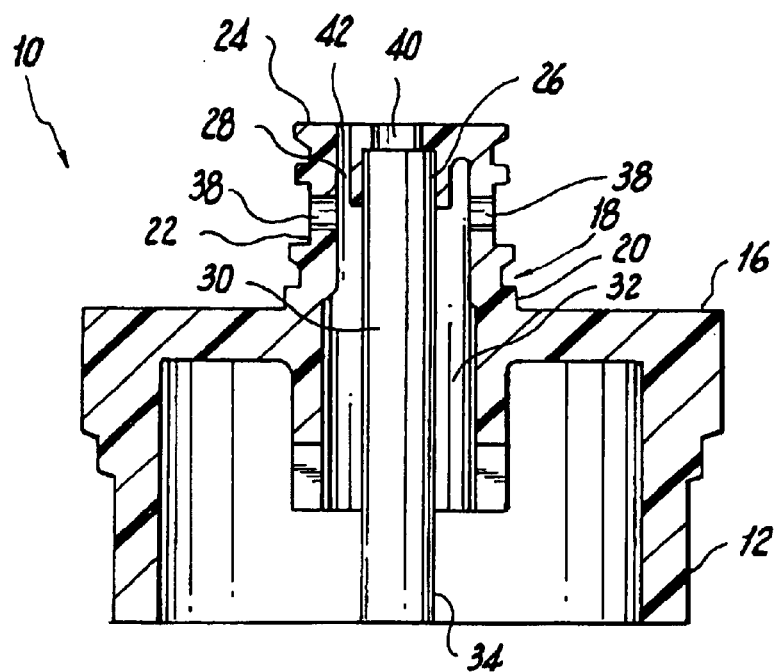
FIG. 5 is an elevational cross-sectional view of the cover of FIG. 3 through line 5—5.
Figure 6:
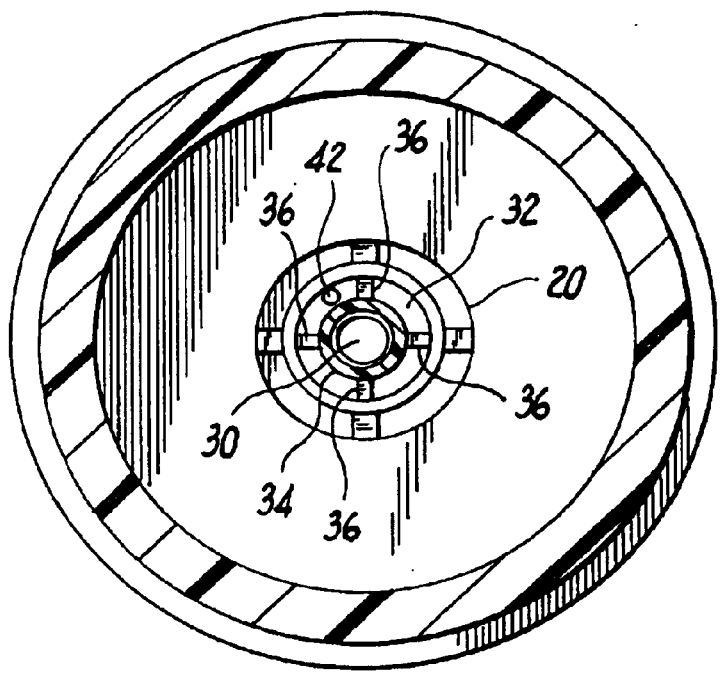
FIG. 6 is a bottom plan view of the cover of FIG. 4 through line 6—6.

The advantages of a filtration assembly constructed or retrofitted in accordance with the present invention will become more readily apparent to those having ordinary skill in the art from the following detailed description of certain preferred embodiments taken in conjunction with the drawings which set forth representative embodiments thereof. Unless otherwise apparent, or stated, directional references, such as "lower" and "upper", are intended to be relative to the orientation of a particular embodiment of the invention as shown in the first numbered view of that embodiment. Also, a given reference numeral indicates the same or similar structure when it appears in different figures.

Referring now to FIG. 1, in which there is illustrated a filter cartridge constructed in accordance with a preferred embodiment of the present disclosure and designated by reference numeral 10. Filter cartridge 10 includes a main housing 12, preferably cylindrically-shaped, which includes a closed lower portion 14 and a generally planar cover 16. The cover 16 may be mated with lower portion 14 after a filtering material (not shown in FIG. 1) is disposed in the housing. A preferred filter media for use in filtering water for soft drinks and in particular carbonated water, is activated carbon. However, proprietary materials are often employed in housing 12. In addition, pre and/or post filtering media, such as screens or polishing agents, may be included in housing 12.

In the following description, an axis extending longitudinally through the cylindrically-shaped housing 12 (i.e., from lower portion 14 through the center of cover 16) is used as a reference to describe features and components of the inventive filter cartridge as being "axial" and "radial" with respect to the aforementioned longitudinal axis. It should also be understood, however, that filter cartridges in various shapes and sizes may be constructed according to the present invention and still fully benefit from the advantages described herein.

With continuing reference to FIG. 1 in conjunction with FIGS. 2 through 6, a neck 18 of substantially uniform outer diameter projects from the cover 16 of main housing 12. Neck 18 is formed by a proximal end 20 connected with cover 16, an elongated portion 22 extending axially from the proximal end 20 and a distal end 24. Preferably, proximal end 20 is mated together or integrally formed with cover 16.

A pair of seals, preferably O-rings, which include a distal O-ring 26 and a proximal O-ring 28 are mounted within annular recesses 29 along the outer periphery of neck 18 which are configured to accommodate the O-rings therein. O-rings 26 and 28 are preferably fabricated of an elastic, durable and inert material. Neck 18 is at least partially hollowed out to form an axial passage into housing 12. The axial passage in neck 18 is divided into a radially inner axial passage 30 and radially outer axial passage 32. In this embodiment, the radially inner axial passage 30 is formed by a tube 34 which extends axially into lower portion 14 and is supported in neck 18 by a pair of diametrically opposed indentations 36 which extend radially inward from the inner surface of neck 18. Thus, the radially outer axial passage 32 is defined by the outer circumference of tube 34 and the inner circumference of neck portion 18, as shown particularly in FIG. 6. A pair of diametrically opposed openings on elongated portion 22 including opening 38 provide access to the radially outer axial passage 32. A tube opening 40 at distal end 24 provides a second conduit through neck 18 and into the lower portion 14 of the housing. A second opening 42 in distal end 24 provides access to outer axial passage 32, referred to herein as bypass opening. Preferably, bypass 42 is bored, or otherwise created, adjacent tube opening 40.

Figure 7:
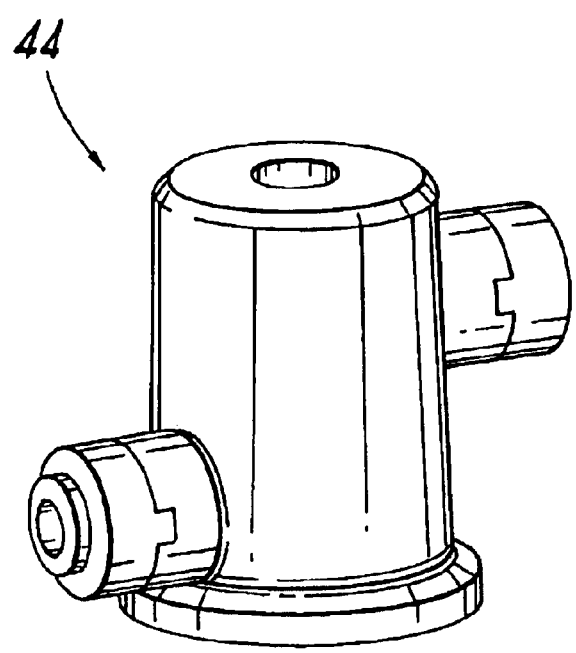
FIG. 7 is a perspective view of an exemplary filter head in which a filter cartridge constructed in accordance with the present invention may be installed.

The neck 18 of filter cartridge 10 is adapted and configured for reception within a central core of a filter head, such as filter heads 44, 46 and 48 shown in FIGS. 7, 8 and 9, respectively. Each of the three exemplary filter heads include a core for receiving neck 18 of cartridge 10, and conduits for providing fluid communication with openings 38, 40 and 42 when neck 19 is installed within in the core. The conduits are attached, threadably or otherwise, to a fluid supply and fluid receiving apparatus, which may include further filter heads or a device for end use, such as a fluid mixer.

Figure 10:
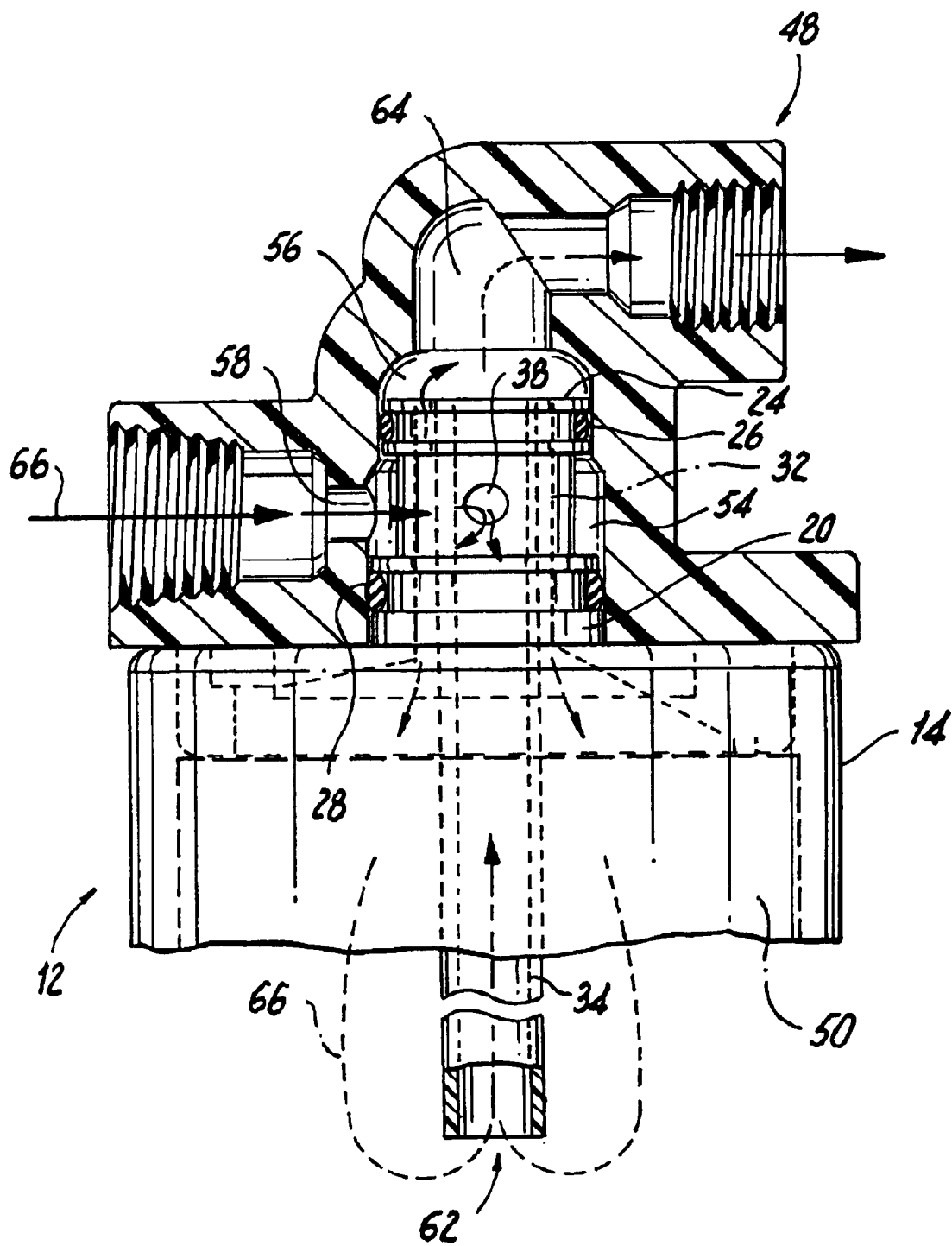
FIG. 10 is a cross-sectional enlarged view of a disposable cartridge constructed in accordance with the present invention and mated with the filter head of FIG. 9.
Figure 11:
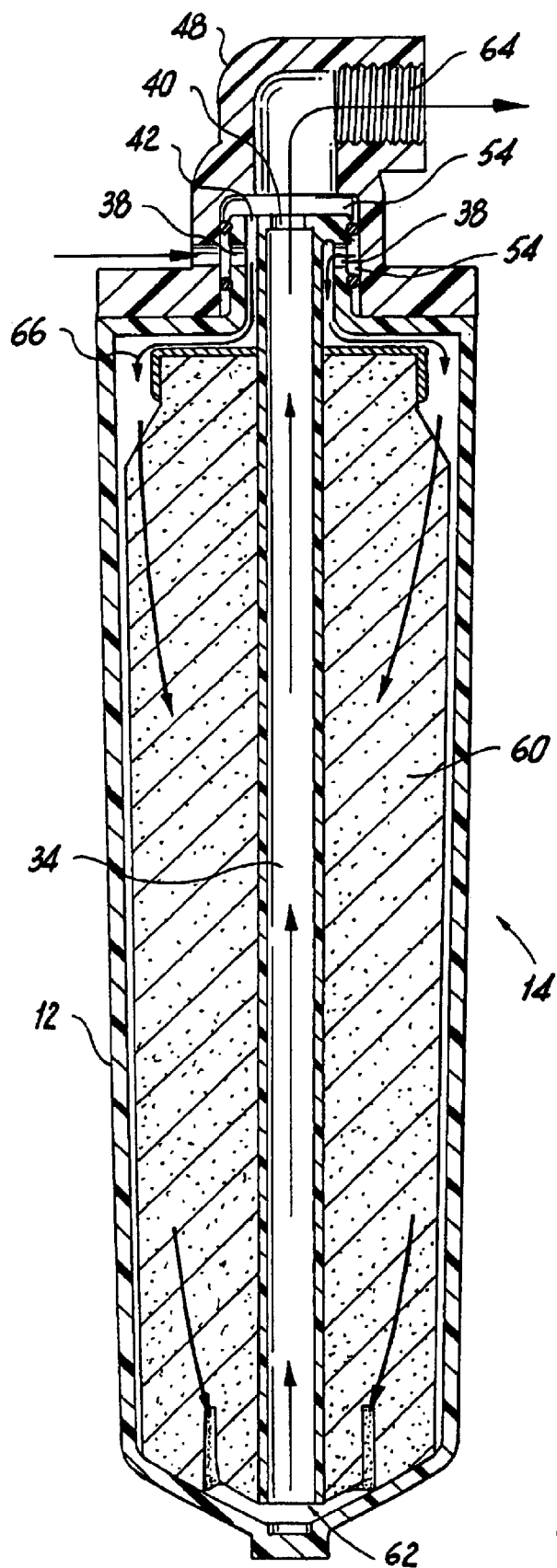
FIG. 11 is an elevational cross sectional view of a disposable cartridge which is mated with the filter head of FIG. 9.

As shown FIGS. 10 and 11, neck 18 is installed in core 50 of a filter head which is substantially similar to filter head 48 of FIG. 9. Installing cartridge 10 in core 50, defines a first annular fluid reservoir 54 bounded radially between the inner periphery of core 50 and the outer periphery of elongated portion 22, and bounded axially between proximal and distal O-rings 26 and 28. A second fluid reservoir 56 is also defined by installing cartridge 10 in core 50 between the interior distal end of core 50 and distal end 24 of neck 18.

In operation, untreated fluid is fed through conduit 58 in filter head 48 to first reservoir 54, which in turn flows into outer axial passage 32 of cartridge 10 via openings 38. Fluid entering outer axial passage 32 primarily flows into lower portion 14 and contacts filter media 60 for treatment. A portion of the fluid flow entering outer axial passage 32 exits cartridge 10 untreated via bypass 42 which feeds to second reservoir 56. The portion of fluid influent contacting filter media 60 thereafter enters tube 34 through a proximal opening 62. The pressure of the fluid in cartridge 10 results in fluid flow through tube 34 and into the second reservoir 56 via opening 40 in distal end 24. Thus, when in operation, treated fluid from opening 40 is mixed in second reservoir 56 with a portion of untreated fluid from bypass 42. The combined effluent flow is supplied by reservoir 56 to a conduit 64 defined in filter head 48, and may thereafter be directed to process equipment or additional filter heads and cartridge systems in accordance with the present invention, or otherwise. The flow of fluid through this embodiment is illustrated by arrows 66 in FIGS. 10 and 11. Alternatively, the flow of fluid may be reversed such that fluid influent derives from reservoir 56 and flows into openings 40 and 42, exiting the cartridge via opening 38 into reservoir 54.

Figure 12:
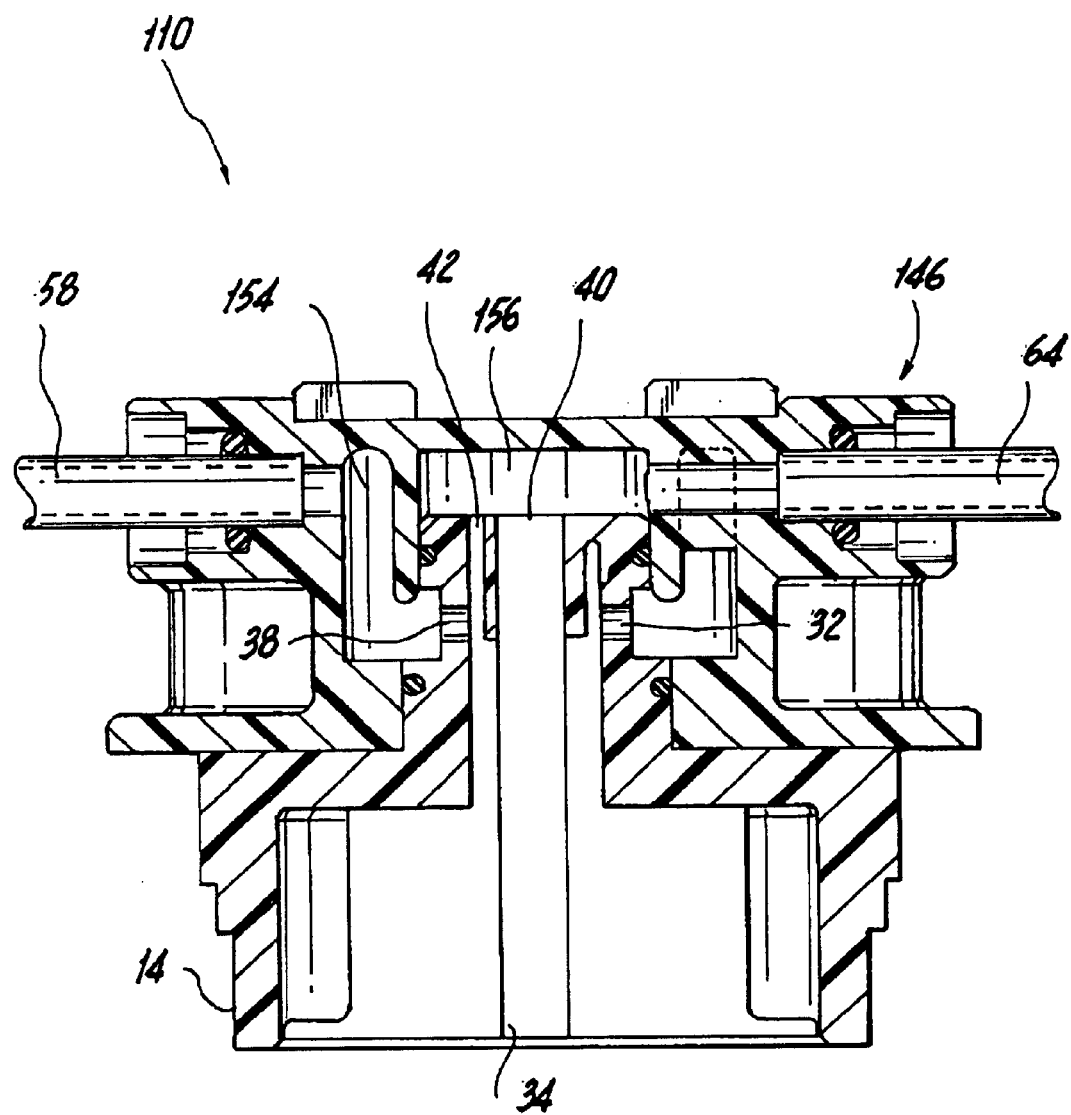
FIG. 12 is a cross-sectional view of a disposable cartridge constructed in accordance with the present invention and mated with the filter head of FIG. 8.

FIG. 12 depicts another exemplary mating between a cartridge 110 and a filter head 146, wherein reservoirs 154 and 156 differ in volume, when compared to the previous embodiment of FIGS. 10 and 11, due to the different internal design of filter head 146.

The following test results illustrate some of the advantages of a filter cartridge constructed in accordance with the present invention. Filter cartridges having filter media for reducing water hardness were tested to determine the effect of bypass size (by diameter) on hardness reduction and removal efficiency. The hardness, that is, the presence of calcium (Ca) and magnesium (Mg), was tested in influent and effluent water samples for all cartridges.

The samples of water were removed under the same conditions (e.g., after 20 gallons at a flow rate of 0.6 gallons per minute and a line pressure of 50 pounds per square inch) each time the test was conducted and the presence of Ca and Mg in the samples was determined via Inductive Coupled Plasma Atomic Emission Spectroscopy. Hardness may be expressed in grains per gallon (gpg) or as below, in parts per million (ppm or mg/L) as calcium carbonate ($CaCO_3$) equivalent (note that 1 gpg hardness is equal to 17.1 ppm or mg/L).

The following formula is used to determine the hardness in ppm:

Hardness, ppm=([Ca, ppm]*2.497)+([Mg, ppm]*4.116)

For example, the influent sample after 20 gallons had flowed into a cartridge 10, wherein the bypass 42 possessed a diameter of 0.052 inches (1.32 millimeters), was found to have concentrations of 33 ppm of Ca and 7.0 ppm of Mg. Thus, in accordance with the above formula:

Hardness, ppm=([33 ppm]*2.497)+([7.0 ppm]*4.116)

Hardness, ppm=82.4 ppm+28.8 ppm

Hardness, ppm=111 ppm

A sample taken from the effluent was determined to contain 6.7 ppm of Ca and 1.9 ppm of Mg, thus the hardness was calculated to be 25 ppm.

The hardness removal efficiency is determined by dividing the difference in hardness between the influent and effluent by the hardness of the influent. In the above example, the hardness removal efficiency is calculated to be 77.5%.

For comparative purposes, it should be understood that similar filter cartridges without a bypass 42, or that otherwise do not mix influent with effluent, which are put under the same conditions would output an effluent flow containing negligible amounts, if any, of Ca and Mg. Thus, the aforementioned filter cartridges effectively output an effluent stream having a hardness of zero and hardness removal efficiency of 100%. The reduction in hardness removal efficiency is therefore the difference between total hardness removal (i.e., 100%) and actual hardness removal, which in the present example is 22.5%.

TABLE 1

| Bypass | | Influent | | Effluent | | Reduction in Hardness |
|---|---|---|---|---|---|---|
| Diameter (inches) | Sample (gallons) | pH | hardness (ppm) | pH | hardness (ppm) | Removal Efficiency |
| 0.052 | 20 | 7.44 | 111 | 5.37 | 25 | 22.5% |
| 0.059 | 20 | 7.42 | 121 | 5.36 | 30 | 24.8% |

Preferably, the bypass is substantially circular in shape, and could be created on an already existing filter cartridge by using a circular drill or boring device. Thus, in the above examples, the cartridge with a bypass diameter of 0.052 inches has an opening area of 0.00212 $in^2$ (1.37 $mm^2$) and the cartridge with a bypass diameter of 0.059 inches (1.5 millimeters) has an opening area of 0.00273 $in^2$ (1.77 $mm^2$).

Table 2 illustrates the results of tests conducted with a cartridge 10 having a bypass 42 with a diameter of about 0.0465 inches (1.181 millimeters) and an opening area of 0.0017 $in^2$ (2.58 $mm^2$). The pressure in the feed water line was 70 psi and the flow rate to cartridge 10 was varied as shown below.

TABLE 2

| Flow | | | Influent | | Effluent | | Reduction in Hardness |
|---|---|---|---|---|---|---|---|
| Rate (gpm) | ΔP (psia) | pH | Alkalinity (ppm) | hardness (gpg) | pH | Alkalinity (ppm) | hardness (gpg) | Removal Efficiency |
| 0.25 | 4.02 | 7.58 | 70 | 6 | 6.37 | 20 | 2 | 33.3% |
| 0.5 | 9.66 | 7.71 | 70 | 6 | 6.23 | 30 | 2 | 33.3% |
| 0.75 | 16.01 | 7.72 | 70 | 6 | 6.28 | 25 | 2 | 33.3% |
| 1 | 24.21 | 7.71 | 80 | 6 | 6.38 | 25 | 2 | 33.3% |

As shown in Table 2, the hardness removal rate (66.7%) for a given bypass diameter stayed constant over various flow rates. Therefore, the reduction of the hardness removal rate also stayed constant. Table 3 below illustrates the results of the same test as shown in Table 2 applied to a filter cartridge much like cartridge 10, but without having a bypass 42.

TABLE 3

| Flow Rate (gpm) | ΔP (psia) | pH | Influent Alkalinity (ppm) | hardness (gpg) | pH | Effluent Alkalinity (ppm) | hardness (gpg) | Reduction in Hardness Removal Efficiency |
|---|---|---|---|---|---|---|---|---|
| 0.25 | 5.5 | 7.58 | 70 | 6 | 5.52 | 5 | 0 | 0% |
| 0.5 | 11.9 | 7.48 | 60 | 6 | 5.64 | 10 | 0 | 0% |
| 0.75 | 19.8 | 7.6 | 70 | 6 | 5.94 | 10 | 0 | 0% |
| 1 | 28.5 | 7.61 | 70 | 6 | 6.11 | 15 | 0 | 0% |

As shown in Table 3, hardness removal is 100%. It should also be noted that the pressure drop is higher than that of the cartridge 310 under the same conditions.

It should be readily apparent that a filter cartridge constructed in accordance with the present invention is not suitable in a system requiring 100% hardness reduction. However, as shown herein, the rate of hardness reduction may be controlled by varying the diameter of the bypass in a filter cartridge constructed in accordance with the present invention. Furthermore, the filter cartridge of the present invention results in a lower pressure drop and longer life, by, among other things, allowing a portion of the influent stream to pass through untreated. The present invention is advantageously adapted to existing systems without the need for redesigning or reconfiguring existing equipment, or radically changing the design of the cartridge itself.

While the systems and methods for using the systems contained herein constitute preferred embodiments of the invention, it is to be understood that the invention is not limited to these precise systems and methods of use, and that changes may be made thereto without departing from the scope of the invention which is defined in the appended claims.

What is claimed is:

1. A connective end of a filter cartridge for providing fluid communication between a filter media chamber and a filter head having a receiving core, a first conduit and a second conduit, the connective end comprising:

a substantially hollow neck configured to engage the filter head receiving core, the neck defining a distal end portion, an elongated portion and a proximal end portion for mating with the filter media chamber;

a tubular member disposed axially in the neck, the tubular member defining an inner axial passage therein and a radially outer axial passage within the neck, the outer axial passage being bounded by the periphery of the tubular member and inner surface of the neck, wherein the inner axial passage and the outer axial passage provide independent conduits for dual fluid flow through the neck;

a tubular member opening in the distal end portion of the neck for fluid flow therethrough;

at least one outer axial passage opening in the elongated portion of the neck for fluid flow therethrough, a bypass outer axial passage opening in the distal end portion of the neck for bypass fluid flow therethrough;

a proximal radial seal disposed along the outer periphery of the elongated portion of the neck adjacent the proximal end portion for providing a substantially water-tight engagement between the neck and the receiving core when the neck is inserted therein; and a distal radial seal disposed along the outer periphery of the elongated portion of the neck adjacent the distal end portion for providing a substantially water-tight engagement between the neck and the receiving core when the neck is inserted therein, wherein the proximal and distal radial seals maintain the integrity of fluid communication between the first conduit and the at least one outer axial passage opening and between the second conduit and the tubular opening and the bypass outer axial passage opening, respectively, when the neck is inserted within the receiving core.

2. A connective end of a filter cartridge as recited in claim 1, wherein the bypass opening is substantially circular.

3. A connective end of a filter cartridge as recited in claim 2, wherein the bypass opening has a diameter ranging from about 0.762 millimeters to about 1.78 millimeters.

4. A connective end of a filter cartridge as recited in claim 2, wherein the bypass opening has a diameter of about 1.181 millimeters.

5. A connective end of a filter cartridge as recited in claim 1, wherein the bypass opening has an area ranging from about 0.45 mm$^2$ to about 2.5 mm$^2$.

6. A connective end of a filter cartridge as recited in claim 1, wherein there are two pairs of diametrically opposed outer axial passage openings disposed in the elongated portion of the neck.

7. A filter cartridge, comprising:

a filter media chamber and a connective end for providing fluid communication between the filter media chamber and a filter head having a receiving core, a first conduit and a second conduit, the connective end comprising:

(a) a substantially hollow neck defining a distal end portion, an elongated portion and a proximal end portion mated with the filter media chamber;

(b) a tubular member disposed axially in the neck and extending into the filter media chamber, the tubular member defining an inner axial passage therein and a radially outer axial passage bounded by the periphery of the tubular member and inner surface of the neck, wherein the inner axial passage and the outer axial passage provide independent conduits for dual fluid flow through the neck and the filter media chamber;

(c) a tubular member opening in the distal end portion of the neck for fluid flow therethrough;

(d) at least one outer axial passage opening in the elongated portion of the neck for fluid flow therethrough;

(e) a bypass outer axial passage opening in the distal end portion of the neck for bypass fluid flow therethrough;

(f) a proximal radial seal disposed along the outer periphery of the elongated portion of the neck adjacent the proximal end portion for providing a substantially water-tight engagement between the neck and the receiving core when the neck is inserted therein; and (g) a distal radial seal disposed along the outer periphery of the elongated portion of the neck adjacent the distal end portion for providing a substantially water-tight engagement between the neck and the receiving core when the neck is inserted therein, wherein the proximal and distal radial seals maintain the integrity of fluid communication between the first conduit and the at least one outer axial passage opening and between the second conduit and the tubular opening and the bypass outer axial passage opening, respectively, when the neck is mated with the receiving core.

8. A filter cartridge as recited in claim 7, wherein the bypass opening is substantially circular.

9. A filter cartridge as recited in claim 8, wherein the bypass opening has a diameter ranging from about 0.762 millimeters to about 1.78 millimeters.

10. A filter cartridge as recited in claim 8, wherein the bypass opening has a diameter of about 1.181 millimeters.

11. A filter cartridge as recited in claim 7, wherein the bypass opening has an area ranging from about 0.45 mm$^2$ to about 2.5 mm$^2$.

12. A filter cartridge as recited in claim 7, wherein there are two pairs of diametrically opposed outer axial passage openings disposed in the elongated portion of the neck.

13. A filter cartridge and filter head assembly, comprising:

(a) a filter cartridge including:
a filter media chamber and a connective filter end for providing fluid communication between the filter media chamber and a filter head, the connective filer end comprising:
(i) a substantially hollow neck defining a distal end portion, an elongated portion and a proximal end portion mated with the filter media chamber;
(ii) a tubular member disposed axially in the neck and extending into the filter chamber, the tubular member defining an inner axial passage and a radially outer axial passage bounded by the periphery of the tubular member and inner surface of the neck, wherein the inner axial passage and the outer axial passage provide independent conduits for dual fluid flow through the neck and the filter media chamber;
(iii) a tubular member opening in the distal end portion of the neck for fluid flow therethrough;
(iv) at least one outer axial passage opening disposed in the elongated portion of the neck for fluid flow therethrough;
(v) a bypass outer axial passage opening in the distal end portion of the neck for bypass fluid flow therethrough;

(vi) a proximal radial seal disposed along the outer periphery of the elongated portion of the neck adjacent the proximal end portion for providing a substantially water-tight engagement between the neck and a receiving core when the neck is inserted therein;
(vii) a distal radial seal disposed along the outer periphery of the elongated portion of the neck adjacent the distal end portion for providing a substantially water-tight engagement between the neck and the receiving core when the neck is inserted therein; and (b) the filter head including the receiving core configured to engage the neck of the filter cartridge, a first conduit having an opening to the receiving core positioned adjacently with respect to the elongated portion of the neck when the neck is engaged within the receiving core, and a second conduit having an opening to the receiving core positioned adjacently with respect to the distal portion of the neck when the neck is engaged within the receiving core, wherein the proximal and distal radial seals define a first reservoir bounded by the proximal and distal radial seals and receiving core in fluid communication with the first conduit opening and the at least one outer axial passage opening and a second fluid reservoir bounded by the distal seal and the receiving core in fluid communication with the second conduit opening, the tubular opening and the bypass outer axial passage opening, respectively.

14. A filter cartridge and filter head assembly as recited in claim 13, wherein the bypass opening is substantially circular.

15. A filter cartridge and filter head assembly as recited in claim 14, wherein the bypass opening has a diameter ranging from about 0.762 millimeters to about 1.78 millimeters.

16. A filter cartridge and filter head assembly as recited in claim 14, wherein the bypass opening has a diameter of about 1.181 millimeters.

17. A filter cartridge and filter head assembly as recited in claim 13, wherein the bypass opening has an area ranging from about 0.45 mm$^2$ to about 2.5 mm$^2$.

18. A filter cartridge and filter head assembly as recited in claim 13, wherein there are two pairs of diametrically opposed outer axial passage openings disposed in the elongated portion of the neck.

19. A filter cartridge and filter head assembly as recited in claim 13, wherein the filter media reduces water hardness.

20. A filter cartridge and filter head assembly as recited in claim 13, wherein the first conduit is connected to an influent water supply.

* * * * *